March 24, 1959
W. T. CORSETTE
2,879,083
HIGH PRESSURE SWIVEL CONNECTOR FOR ADJUSTABLE
CONDUITS WITH STRAIN RELIEF MEANS
Filed Nov. 16, 1953
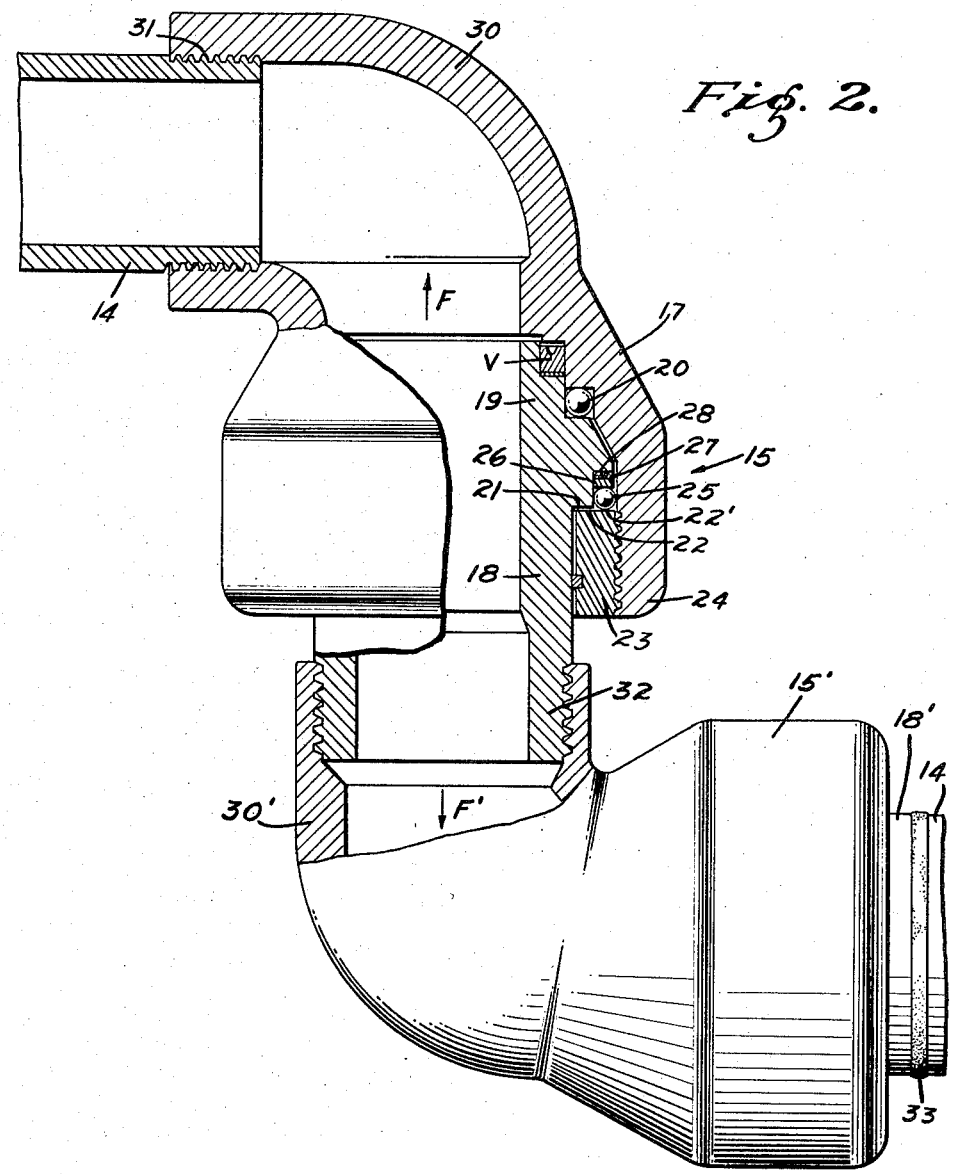
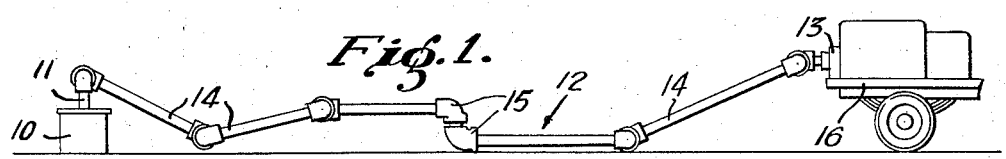
INVENTOR
William T. Corsette
BY
Attorney

United States Patent Office 2,879,083
Patented Mar. 24, 1959

2,879,083

HIGH PRESSURE SWIVEL CONNECTOR FOR ADJUSTABLE CONDUITS WITH STRAIN RELIEF MEANS

William T. Corsette, Long Beach, Calif., assignor, by mesne assignments, to The Youngstown Sheet and Tube Company Application November 16, 1953, Serial No. 392,092

1 Claim. (Cl. 285—114)

My invention relates to conduits for conducting fluids under extremely high pressure and relates in particular to a conduit which may be folded and arranged for transportation without necessity of dissembling its component parts.

It is an object of the invention to provide a conduit which may be adjusted in a position in which it is to be used, and which, when fluid pressure is applied therein, becomes rigid. This adjustable conduit consists of lengths of pipe joined by swivel connectors consisting of shells or bodies connected by bearing means so that they freely rotate when the conduit is subjected to relatively low internal pressure, these connectors having means for limiting the maximum pressure to which the thrust bearings thereof may be subjected, so that the thrust bearings cannot be injured or caused to wear rapidly because of extremely high fluid pressures applied to the conduit.

My invention is especially suited for well cementing operations wherein a cement mixture is pumped into the well at pressures which may reach a value of 20,000 lbs. per sq. in. It is customary to use a jointed conduit to connect the cement pump with the upper end of the cement pipe which extends down into the well. The jointed conduit consists of pipe sections connected by swivel connector fittings having roller or ball bearings to transmit the radial and thrust loads between the component parts of the fittings. There has been a gradual increase in the pressures used in well cementing operations. This has required increase in the size of the swivel connectors employed in the jointed cement conduit, until at the present time these swivel connectors have reached extreme size so as to enable use therein of large ball or roller bearings which will withstand the heavy thrust loads for at least a short period of time. In my present invention I provide a high pressure jointed conduit having swivel joints or connections so formed that the load applied to the thrust bearings of the swivel joints may not exceed a predetermined value which is far within the safe working limits of the thrust bearings. The swivel joints or connectors of my adjustable high pressure conduit are provided with shoulders arranged to take the thrust loads between the shell or body parts of the connectors when a predetermined pressure in the conduit is reached and this engagement of the thrust receiving shoulders causes the connectors and therefore the jointed conduit to become substantially rigid, rigidity of the conduit being maintained during the use of the conduit under high internal pressure, with the conduit becoming again flexible when fluid pressure therein is reduced to a low or zero value.

It is also the object of the invention to provide a swivel connector having inner and outer hollow body parts in telescoping relation and with thrust shoulders arranged to prevent separation of the body parts, there being axially yieldable thrust bearing means operative between the body parts to hold them in such positions that the thrust receiving shoulders of the body parts will be relieved of thrust pressure when the internal pressure acting within the jointed conduit is at a relatively low or zero value, the yieldability of the bearing means permitting tight engagement of the thrust shoulders at relatively higher internal fluid pressure, thereby limiting the thrust load which may be applied to the thrust bearing means.

Further objects and advantages of the invention may be brought out in the following part of the specification wherein I have described simple embodiments of the invention for the purpose of completeness of disclosure, without intention to limit the scope of the invention which is set forth in the accompanying claim, or restrict the range of mechanical equivalence to which the claims may be entitled.

Referring to the accompanying drawings which are for illustrative purposes only;

Fig. 1 is an elevational view showing my adjustable conduit; and

Fig. 2 is an enlarged sectional view of one of the swivel connectors employed in the adjustable conduit.

In Fig. 1, I schematically show the upper end of the casing 10 of a well in which a cementing string 11 is extended for the purpose of conducting cementing operations within the well. An adjustable conduit 12 connects the high pressure cement pump 13 with the cementing string 11 for delivery of the cement mixture into the string 11 under suitable pressure. The adjustable conduit 12 includes pipe sections 14 connected by swivel joints 15. The adjustable conduit 12 may be folded and transported to the location of the well on which the cementing operations are to be performed. It may be then laid out upon the ground and extended from the upper end of the cementing string to the cementing truck 16 which carries the pump 13. During this time the pressure within the conduit 12 is at atmospheric pressure, or in other words at zero differential pressure. At this time the connectors are freely rotatable so that the conduit may be easily arranged between the cementing string 11 and the pump 13.

The swivel joints or connectors 15 of the adjustable conduit 12 are constructed as shown in Fig. 2. Each swivel connector includes an outer part 17 and an inner part 18 disposed in telescoping relation. Around the inner portion 19 of the inner member 18 there is a bearing means comprising a circular row of balls 20. These balls 20 are arranged so that they transmit radial loads between the outer part 17 and the end portion 19 of the inner member 18, and to act in thrust to limit movement of the inner member 18 into the outer member 17. The inner member 18 carries an outwardly faced thrust shoulder 21 for engaging an inwardly faced thrust shoulder 22 which is formed on a ring 23 which is threaded into the outer end 24 of the outer member 17. These thrust shoulders 21 and 22 comprise thrust shoulder means for limiting outward movement of the inner member 18 from the outer member 17, and thereby preventing separation of the members 17 and 18 of the swivel connector.

Adjacent the thrust shoulders 21 and 22 there are roller type bearing means 25 of yieldable character tending to separate the shoulders 21 and 22, or at least reducing the pressure of engagement between the shoulders 21 and 22 to such low value that the member 18 may turn readily within the outer member 17 when the pressure within the parts 17 and 18 is at low value. This bearing means comprises a row of balls 25 arranged as radial bearing means between the outer and inner members 18 and also engaging a thrust shoulder 22' which is carried by the outer member 17 adjacent the thrust shoulder 22. The inner member 18 carries a ring 26 in spaced relation to the shoulder 22' for engaging the opposite sides of the balls 25. The inner or leftward face of the ring 26 is supported by resilient means 27 which is disposed between the ring 26 and a shoulder 28 formed on the inner member 18. The resilient means 27 is shown as a ring of resilient or compressible material such as a rubber compound or plastic. Preferably this ring 27 is of such axial dimension that it will position the balls 25 so that they will hold the thrust shoulders 21 and 22 in slightly spaced relation when there is no fluid pressure acting within the conduit 12 and the fittings 15 tending to pull the inner member 18 rightwardly out of the outer member 17. However, the thrust bearing means including the balls 25, ring 26 and resilient member 27 may be arranged so that it will only tend to separate the shoulders 21 and 22, thereby reducing the pressure of engagement between these shoulders 21 and 22 so that one may slide relatively freely upon the other, thereby permitting a relatively free rotation of the member 18 within the member 17.

The member 17 has an elbow extension 30 projecting rearwardly, or away from its front end 24 to which a pipe section 14 may be connected as by use of a threaded joint 31. The inner member 18 has a threaded extension 32 arranged to be screwed into the elbow extension 30' of another swivel connector 15 specifically indicated by the numeral 15' and being of construction identical with that prescribed in the foregoing. The inner member of this other swivel connector, indicated by the numeral 18' may be connected to a pipe section 14 by any suitable means, such as a weld 33 for example.

When fluid pressure is applied to the interior of the swivel connector shown in Fig. 2, forces F and F' are incurred, tending to separate the connector parts 17 and 18. As these forces increase there will be a gradual compression of the ring 27 to permit the thrust shoulder 21 to engage the thrust shoulder 22 at a pressure considerably below that of which the balls 25, the shoulder 22' or the face of the ring 26 might be injured. The thrust receiving shoulders 21 and 22 then act as the thrust bearings between the inner and outer members 17 and 18 for the reason that they carry the load transmitted between the parts and may slide one upon the other, instead of becoming rigid. Escape of fluid is prevented by a sealing ring V disposed between the inner end of the inner member 18 and the adjacent wall of the outer member 17.

I claim:

A high pressure swivel connection comprising: a first shell having a right-angle elbow formed integrally thereto, a tubular member fitted telescopically into the shell, a sealing ring mounted around the tubular member at the outermost end thereof in fluid sealing relationship between an outer annular surface of the tubular member and an adjacent inner annular surface of the shell, a first axial thrust shoulder formed annularly on the tubular member; a first axial thrust shoulder formed annularly on the shell in confronting, cooperating relationship with said first thrust shoulder on the tubular member, a first plurality of ball bearings operatively mounted between said first thrust shoulders of the tubular member and of the shell, a second axial thrust shoulder formed annularly on the tubular member and facing oppositely to said first thrust shoulder of the tubular member, a rubber ring mounted on said second axial thrust shoulder of the tubular member, a metallic ring also mounted on said second axial thrust shoulder of the tubular member adjacent the rubber ring, a third axial thrust shoulder formed annularly on the tubular member and facing oppositely to said first thrust shoulder on the tubular member and being radially inward of and axially spaced from said second thrust shoulder on the tubular member, a ring threaded into the shell around the tubular member and forming a second axial thrust shoulder on the shell in confronting, cooperating relationship with said second and said third axial thrust shoulders on the tubular member, a second plurality of ball bearings operatively mounted between said metallic ring in said second axial thrust shoulder of the tubular member and said second axial thrust shoulder on the shell, the axial spacing between the second and third thrust shoulders on said tubular member being less than the combined axial thickness of said rubber ring, said metal ring and said second ball bearing means when such members are in their normal operating position whereby, upon undue axial separating force between said shell and said tubular member, the said rubber ring will yield to bring said third thrust shoulder on said tubular member into contact with said second thrust shoulder on said shell member to thereby limit the compressive load sustained by said second ball bearing means, a second shell having a right-angle elbow formed integrally thereto and identical with said first shell, said elbow of said second shell being threadedly connected to the tubular member fitted into said first shell, and a second tubular member identical with said first mentioned tubular member identically fitted into said second shell.

References Cited in the file of this patent

UNITED STATES PATENTS

| | | |
|---|---|---|
| 715,425 | Schamp | Dec. 9, 1902 |
| 819,592 | Phillips | May 1, 1906 |
| 1,202,787 | Bradshaw | Oct. 21, 1916 |
| 1,204,822 | Roylance | Nov. 14, 1916 |
| 1,853,675 | English | Apr. 12, 1932 |
| 1,925,724 | Robinson | Sept. 5, 1933 |
| 1,989,980 | Hamer | Feb. 5, 1935 |
| 1,995,109 | Smittle | Mar. 19, 1935 |
| 2,322,679 | Williamson | June 22, 1943 |
| 2,438,529 | Woodling | Mar. 30, 1948 |
| 2,511,261 | Heinrich | June 13, 1950 |
| 2,587,170 | Klingler | Feb. 26, 1952 |

FOREIGN PATENTS

| | | |
|---|---|---|
| 462,322 | Canada | Jan. 10, 1950 |